(12) United States Patent
Luinge et al.

(10) Patent No.: US 10,144,200 B2
(45) Date of Patent: Dec. 4, 2018

(54) FIBER-REINFORCED COMPOSITE MATERIAL WITH IMPROVED FIRE RESISTANCE, AND STRUCTURAL COMPONENT MADE THEREOF

(71) Applicants: EADS Deutschland GmbH, Ottobrunn (DE); The University of Newcastle Upon Tyne, Newcastle upon Tyne (GB)

(72) Inventors: Hans Luinge, DW Hengelo (NL); Matthias Schuett, Ottobrunn (DE); Geoff Gibson, Newcastle upon Tyne (GB)

(73) Assignee: Airbus Defence and Space GmbH, Taufkirchen (DE)

( * ) Notice: Subject to any disclaimer, the term of this patent is extended or adjusted under 35 U.S.C. 154(b) by 31 days.

(21) Appl. No.: 14/363,488

(22) PCT Filed: Dec. 5, 2012

(86) PCT No.: PCT/EP2012/005014
§ 371 (c)(1),
(2) Date: Jun. 6, 2014

(87) PCT Pub. No.: WO2013/083268
PCT Pub. Date: Jun. 13, 2013

(65) Prior Publication Data
US 2015/0174866 A1    Jun. 25, 2015

(30) Foreign Application Priority Data
Dec. 9, 2011   (EP) ..................................... 11009717

(51) Int. Cl.
*B32B 27/08* (2006.01)
*B32B 27/18* (2006.01)
(Continued)

(52) U.S. Cl.
CPC .............. *B32B 27/08* (2013.01); *B32B 3/266* (2013.01); *B32B 5/26* (2013.01); *B32B 5/28* (2013.01);
(Continued)

(58) Field of Classification Search
CPC .......... B32B 2250/42; B32B 2260/023; B32B 27/00; B32B 27/08; B32B 27/12;
(Continued)

(56) References Cited

U.S. PATENT DOCUMENTS 5,344,866 A    9/1994  Hall
5,645,926 A *  7/1997  Horrocks ........... A41D 31/0022
                                                     428/920
(Continued)

FOREIGN PATENT DOCUMENTS

CN    1257443 A    6/2000
CN    1933963 A    3/2007
(Continued)

OTHER PUBLICATIONS

Thermoplastics, Wikipedia, accessed Mar. 23, 2016.*
(Continued)

*Primary Examiner* — Camie S Thompson
(74) *Attorney, Agent, or Firm* — Crowell & Moring LLP

(57) ABSTRACT

A fiber-reinforced composite material includes a bulk portion with a bulk matrix having reinforcing fibers embedded therein, and a surface portion with a plurality of laminated first layers serving as "expanding layers", which expand and/or delaminate during fire impact. The surface portion also includes a plurality of laminated second layers different from the first layers and serving as "barrier layers". The expanding layers and barrier layers can be arranged in an alternating sequence.

13 Claims, 2 Drawing Sheets

(51) Int. Cl.
  *B32B 27/12* (2006.01)
  *B32B 5/26* (2006.01)
  *B32B 5/28* (2006.01)
  *B32B 7/02* (2006.01)
  *B32B 27/00* (2006.01)
  *B32B 27/28* (2006.01)
  *B32B 3/26* (2006.01)

(52) U.S. Cl.
  CPC ............... *B32B 7/02* (2013.01); *B32B 27/00* (2013.01); *B32B 27/12* (2013.01); *B32B 27/18* (2013.01); *B32B 27/281* (2013.01); *B32B 27/285* (2013.01); *B32B 27/286* (2013.01); B32B 2250/42 (2013.01); B32B 2260/023 (2013.01); B32B 2260/046 (2013.01); B32B 2264/02 (2013.01); B32B 2264/06 (2013.01); B32B 2264/10 (2013.01); B32B 2264/104 (2013.01); B32B 2264/108 (2013.01); B32B 2305/07 (2013.01); B32B 2305/30 (2013.01); B32B 2307/3065 (2013.01); B32B 2605/18 (2013.01); *Y10T 428/269* (2015.01); *Y10T 428/31511* (2015.04)

(58) Field of Classification Search
  CPC ........ B32B 2307/3065; B32B 2605/18; B32B 5/26; B32B 5/28; B32B 7/02; B32B 2305/30; B32B 2264/10; B32B 27/18; B32B 2260/046; B32B 278/00; B32B 278/08; B32B 27/281; B32B 27/285; B32B 27/286; B32B 3/266; B32B 2305/07; B32B 2264/02; B32B 2264/06; B32B 2264/24; B32B 2264/108; B29C 2250/42; Y10T 428/269; Y10T 428/31511
  USPC ............. 428/339, 292.1, 297.1, 297.4, 300.7
  See application file for complete search history.

(56) References Cited

U.S. PATENT DOCUMENTS

| | | | |
|---|---|---|---|
| 6,230,458 | B1 | 5/2001 | Silc et al. |
| 6,511,730 | B1 | 1/2003 | Blair et al. |
| 2003/0124930 | A1* | 7/2003 | Horrocks ................ E04B 1/94 442/131 |
| 2004/0086729 | A1 | 5/2004 | Nguyen et al. |
| 2005/0215142 | A1 | 9/2005 | Bascom et al. |
| 2005/0232828 | A1* | 10/2005 | Merry .................. F01N 3/2857 422/179 |
| 2006/0178064 | A1* | 8/2006 | Balthes ................ B29C 43/003 442/59 |
| 2009/0304560 | A1* | 12/2009 | Dietz ....................... B32B 5/26 422/179 |
| 2011/0143619 | A1 | 6/2011 | Luinge et al. |
| 2011/0301268 | A1* | 12/2011 | Oobayashi ............. C08L 23/10 524/219 |

FOREIGN PATENT DOCUMENTS

| | | | |
|---|---|---|---|
| DE | 199 09 000 A1 | | 9/2000 |
| EP | 0 501 271 A2 | | 9/1992 |
| EP | 1 106 744 A1 | | 6/2001 |
| JP | 61-097344 | * | 10/1984 |
| JP | 2000-345638 A | | 12/2000 |
| WO | WO 2010/020237 A2 | | 2/2010 |

OTHER PUBLICATIONS

International Search Report (PCT/ISA/220 & PCT/ISA/210) dated May 8, 2013 (5 pages).
Written Opinion (PCT/ISA/237) dated May 8, 2013 (6 pages).
European Search Report dated Jun. 11, 2012 (6 pages).
Chinese Office Action dated May 6, 2015 with English translation (17 pages).

* cited by examiner

FIBER-REINFORCED COMPOSITE MATERIAL WITH IMPROVED FIRE RESISTANCE, AND STRUCTURAL COMPONENT MADE THEREOF

BACKGROUND AND SUMMARY OF THE INVENTION

Exemplary embodiments of the present invention relate to fiber-reinforced composite materials useful for applications where a high strength-to-density ratio is demanded. For example, this applies for structural components of aerial vehicles as e.g. airplanes and helicopters.

A conventional fiber-reinforced composite material comprises a matrix and reinforcing fibers embedded therein. The matrix is often a thermally curable resin, possibly with particular additives ("resin system"). The reinforcing fibers are usually provided in form of dry or pre-impregnated fiber mats, which are processed in an infusion process or a prepreg process, respectively. Such processing can take place in a forming tool (mold), in which a plurality of fiber mats, as e.g. woven fabrics or non-crimp fabrics, are stacked and cured for manufacturing the fiber-reinforced composite material.

Depending on the material used to create the matrix, many fiber-reinforced composite materials have insufficient a fire performance for their applications. Conventional materials as e.g. carbon fiber reinforced plastics (CFRP) may ignite and burn, releasing heat, smoke and toxic gases. In addition, with increasing temperature caused by fire the structural integrity of the structure is decreased. Consequently, loaded composite structures often collapse within a short period of time, when subjected to fire. This is particularly notable when the stresses present are compressive because the compressive strength falls to a very low value when the matrix reaches its softening point.

Exemplary embodiments of the present invention are directed to a fiber-reinforced composite material with improved fire resistance.

The inventive fiber-reinforced composite material comprises a "bulk portion" comprising a bulk matrix with reinforcing fibers embedded therein, and a "surface portion" comprising a plurality of laminated first layers, which expand and/or delaminate during fire impact, preferably above 100% and more preferably above 1000%. In an embodiment, the surface portion is clearly distinguishable from the bulk portion, i.e. has a structure that is different from the structure of the bulk.

In this material, the bulk portion can have a structure of any kind known from the prior art. In a preferred embodiment, the bulk portion is a multilayer structure comprising a plurality of fiber material layers (e.g. tissues, non-crimp fabric, unidirectional fibers etc.) embedded in a resin matrix (bulk matrix). This matrix is preferably an epoxy system or any other resin, e.g. thermally curable resin. Further, the matrix may be a thermoplastics. In other embodiments, the bulk matrix is a system based on benzoxazine or cyanate ester. The latter matrix materials are in particular of interest in aeronautic applications. The reinforcing fibers embedded in the bulk matrix, preferably arranged in the form of fiber mats, may be carbon fibers, glass fibers or other fibers.

It is essential for the invention that such a bulk portion ("bulk composite") is supplemented by additional fire protecting layers, e.g. in form of a separate surface portion ("surface laminate") comprising a plurality of laminated layers, which expand and/or delaminate during fire impact. These layers are referred to as "first layers" or "expanding layers" in the following.

Such a surface portion or "surface laminate" can be provided on one or both surfaces of a sheet-like bulk composite, creating a fire protection for the underlying bulk composite. In another embodiment, the "surface laminate" has the same structure as the "bulk portion", i.e. has reinforcing fibers embedded therein and comprises a plurality of laminated first layers, which expand and/or delaminate during fire impact. Thus, in particular, the "surface laminate" may be identical to the "bulk portion".

When exposed to the heat of fire, the expanding layers will expand and/or delaminate. In this way, a remarkable decrease in the thermal conductivity can be achieved, so that the progress of heat to the underlying bulk portion is slowing down. Thus, the inventive material withstands fire to a greater extent, and maintains structural integrity (in the bulk portion) for an extended period of time.

Preferably, the surface laminate has in case of foils (used in the surface laminate) a thickness of at least 1%, in particular at least 2%, and in case of fiber reinforcements up to 20% of the thickness of an underlying bulk portion. On the other hand, the thickness of the surface laminate is preferably less than 100%, in particular less than 10% of the thickness of the underlying bulk portion. However, as mentioned above, the "first layers" can also be integrated into the "bulk portion", so that the surface portion may be identical to the bulk portion.

In an embodiment, at least one of the expanding layers comprises a thermoplastic film. Preferably, the thermoplastic is a polymer selected from the group consisting of Polyimide (PI), Polyetherimide (PEI), Polyether sulfone (PES), Polyamide (PA), Polyamide-imide (PAI), Polysulfone (PSU), Polyphenylsulfone (PPSU), Polyetherketone (e.g. PEEK, PEKK), Polyethylene terephthalate (PET), Polyethylene (PE), Polyester, Polyetherester (PEE), Polyesteramide, Polymethylmethacrylate (PMMA), Polypropylene (PP), Polystyrene (PS), Polyvinylchloride (PVC) or mixtures thereof.

Preferably, the thermoplastic is selected or modified so that it is able to expand at a temperature, e.g. above its glass transition or melting temperature, which is higher (e.g. in the range of 200 to 240° C.) than the processing temperatures in the manufacturing process, and higher than the service temperatures in the later application.

Preferably, the thermoplastic begins expansion at a temperature of less than 400° C., preferably less than 250° C. In this case, the expansion takes place in the early stages of fire.

The thermoplastic (or polymeric) film may be perforated (provided with apertures as holes and/or slits) to allow the matrix material to be distributed throughout the surface laminate in the production process thereof. For example, a needle or laser perforation can be used to create suitable apertures in the film, improving the infiltrating flow of the matrix material (e.g. epoxy system). To this end, e.g. a hexagonal or square perforation pattern can be provided (perforation distance e.g. 1 to 5 cm, perforation diameter e.g. 0.5 to 2 mm). Slitting or perforation of the film can also be used to increase the draping over curvatures, i.e. increase the drapability.

In an embodiment, at least one of the expanding layers comprises fibers (preferably carbon or glass fiber), e.g. short fibers dispersed in a plastic film, or in the form of a non-woven fabric (e.g. a fleece) embedded in a plastic. Also continuous fibers (unidirectional or woven) can be used.

In an embodiment, at least one of the expanding layers comprises an intumescent modifier, e.g. a foaming agent, expandable graphite and/or a phosphorous product (e.g. Ammoniumpolyphosphate). Such modifiers can advantageously promote the expansion of the respective expanding layer.

In an embodiment at least one of the expanding layers has a thickness in the range of 5 to 300 μm, preferably 10 to 200 μm, more preferably 20 to 130 μm, in particular 125 μm. The composite of an embodiment having expanding layers with a thickness of 125 μm or 125±25 μm has a lower heat release rate and ignites at a later time than composites having thinner or thicker expanding layers.

The surface laminate can comprise e.g. one, two, three, four, or even more expanding layers.

In a preferred embodiment, the surface laminate consists not only of expanding layers (first layers), but further comprises a plurality of laminated layers (second layers) different from the first layers.

The second layers can be designed to have the function of decreasing a transfer of heat, to prevent oxygen (air) to diffuse to the bulk matrix and/or to prevent combustible products from diffusing from the bulk matrix to the outside (ignition zone). Therefore, the second layers are also referred to as "barrier layers" in the following.

With expanding layers and barrier layers as mentioned above, the surface laminate can have a multi-material design comprising of these two different types of layers.

Preferably, the expanding layers and the barrier layers are stacked in an alternating sequence to form the surface laminate. In particular, such sequence may comprise at least one expanding layer and one barrier layer, or e.g. at least two expanding layers and two barrier layers. One example would be the sequence barrier-expanding-barrier-expanding, wherein the outer side of the surface laminate is preferably formed by a barrier layer and the inner side (interface to the bulk composite) is preferably formed by an expanding layer. Other arrangements like e.g. a combination of different barrier layers for synergistic effects is also possible. Another possible arrangement is the combination of expanding layers with different expansion behavior and/or different expansion temperature to optimize the protection of an underlying bulk material. Another possible arrangement are fiber reinforced thermoplastic or fiber reinforced resin layers between or on top of the barrier layers or/and expansion layers, possibly modified, to act as additional barrier, expansion, stabilizing or structural layer.

The alternating layers, described above may also be used throughout the complete material thickness.

In an embodiment, at least one of the barrier layers comprises a matrix ("surface matrix") with reinforcing fibers embedded therein. In this way, the respective barrier layers can advantageously contribute to the mechanical strength of the material. There may be used short fibers (e.g. dispersed in the surface matrix) or continuous fibers in form of a fiber mat. The surface matrix may be the same material as that of the bulk matrix (e.g. an epoxy resin), or another material. In an embodiment, the barrier layers comprise thermoplastic films with continuous fibers (e.g. carbon fibers), unidirectional or woven, e.g. embedded in a PEI prepreg. As a resin, e.g. cyanate esters or resins with high inorganic content (e.g. Si) might be used.

In an embodiment at least one of the barrier layers comprises a polymer. For example, thermoplastic polymers as mentioned above for the expanding layers, in particular Polyimide (PI), Polyamide-imide (PAI), Polyetherketone (e.g. PEEK, PEKK) or Polyphenylsulfone (PPSU) may be used as material for creating barrier layers. Upon exposure to heat, the latter materials form remarkable amounts of soot (decomposition products), which may advantageously contribute to the above mentioned barrier effect.

When a thermoplast polymer or thermosetting polymer is used for a barrier layer, this polymer may also be reinforced by a fiber material (short or continuous fibers).

Alternatively or in addition to such fiber material, at least one of the barrier layers can comprise inorganic or organic particles dispersed in a matrix. This matrix can also be a resin matrix. Preferably, microparticles with an average particle size of less than 100 μm, or nanoparticles with at least one dimension smaller than 100 nm are used. In an embodiment, the barrier layer comprises an inorganic filled epoxy matrix. Preferably, inorganic particles as e.g. phyllosilicates (layered silicates) are used. But each barrier layer may also be modified with other additives or fillers. Preferably, organic particles as e.g. organophosphorous, halogenated, paraffinic, spumific and/or intumescent compounds, polymers or cork are used. PCT patent document WO 2010/020237 describes particles (in a thermoplastics) that can also be used in the present invention as particles in the barrier layer.

In another embodiment, at least one of the barrier layers is a metallic layer.

Each barrier layer may be perforated. To this end, e.g. a hexagonal or square perforation pattern can be provided (perforation distance e.g. 1 to 5 cm, perforation diameter e.g. 0.5 to 2 mm).

As to the process for manufacturing the fiber-reinforced composite material, methods and tools can be applied, which are well known from the fiber composite technology. Examples are transfer molding (RTM, "resin transfer molding"), vacuum-infusion (such as VAP, VARI etc.) and their further developments (such as SLI, LRI, BP-RTM), as well as "Prepregging".

For manufacturing the inventive material, the layers creating the later surface composite can be stacked together with a dry preform or prepreg (one or more fiber material layers) creating the later bulk composite in a forming tool. Then, in case of a dry preform, an infusion process can be provided to infuse the dry preform, and as the case may be also the layers of the surface portion, with liquid or semi-liquid matrix material (e.g. resin as e.g. epoxy resin system). Finally, a curing process (e.g. thermal curing) can be used to bond all layers together (co-curing or co-bonding, respectively).

A thermoplastic film might also partially dissolve to increase the interaction with the resin.

In an alternative processing, at least some (or all) layers creating the bulk portion and the surface portion can be "prepregged" (impregnated) with the respective matrix material before they are stacked in the forming tool (prepreg process). In this case, the expanding, barrier and bulk layers can be laid in the desired order in the tool, and cured (under pressure) afterwards.

Preferably, expanding layers and barrier layers are stacked in an alternating sequence on one or both sides of a multi-layer bulk portion. A typical layout is for example: barrier-expanding-barrier-expanding-bulk. Instead of two expanding layers and two barrier layers in this example, there can be used also more (e.g. three or four) expanding layers and/or barrier layers, up to 100% of the laminate (composite material).

In an embodiment, a barrier layer and expanding layer are combined in advance before the stacking process is carried out. Such a combined expanding-barrier-layer may provide a "soot forming expanding layer". Typical technique for the formation of such a soot forming expanding layer is calendaring (in case of two thermoplastic layers), or "doctorblading" in case of a thermoset and thermoplast combination.

With a curing process the fiber-reinforced composite material is completed.

The inventive material can be advantageously used to form a structural component for an aerial vehicle, in particular for an airplane or helicopter. In an embodiment, the structural component is a fuselage shell or hull section of the respective vehicle.

An important feature of the invention is that when not in the intumesced state, the added material (surface portion) can be designed to be able to share the load carried by the e.g. underlying (bulk) structure. The inventive protective layers does not, therefore, add to the weight of the structure without increasing the strength.

A further important feature of the invention is that when at least one of the expanding layers comprises a thermoplastic film arranged in alternating manner with the barrier layers, although the ignition of the composite start early compared to the state of the art, the heat release is significantly lower, e.g. about 30% to 50% depending on the thickness of the expanding and/or barrier layers. In other words, even if the ignition starts earlier, the heat release and the decomposition for a composite as described by the invention, is significantly lower as for state of the art composites; in addition the time until the bulk material of the composite is decomposed is about 1.5 to 2 times longer than within the state of the art. Thus, the heat from the burning process is released later, so that the flame spread is slower, the heat is lower and the remaining mechanical properties are maintained, as the material is less damaged and fails later.

BRIEF DESCRIPTION OF THE DRAWING FIGURES

The invention will be described hereinafter with reference to an exemplary embodiment with reference to the accompanying drawings. In these drawings.

DETAILED DESCRIPTION

Figure 1:
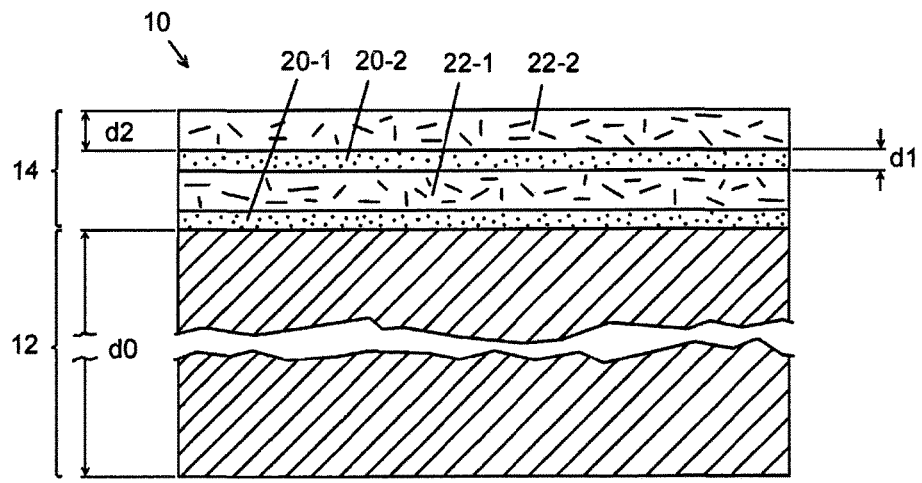
FIG. 1 shows a multi-layer design of a fiber-reinforced composite material.

FIG. 1 is a schematic cross section of a fiber-reinforced composite plastic (FRCP) 10 according to an embodiment of the present invention.

The material 10 is a two-dimensional extending sheet material and consists of a bulk portion 12 and a surface portion 14.

The bulk portion 12 comprises a bulk matrix with reinforcing fibers embedded therein. Preferably, the inner structure of the bulk portion 12 (which is not detailed shown in FIG. 1), is a conventional structure. Especially, the bulk portion 12 can be provided as a conventional epoxy matrix system with carbon or glass fibers embedded therein. The fibers may be provided e.g. in the form of one or preferably more fiber mats (woven or non-woven fabric), which are impregnated in advance or infused during a manufacturing process with the respective epoxy resin. In a curing step, completing the manufacturing process, the bulk portion 12 and the surface portion 14 have been cured and bonded together.

The surface portion 14 serves for an increased fire protection and consists of at least "expanding layers" (first layers) 20-1, 20-2, and in the shown example also of "barrier layers" (second layers) 22-1, 22-2.

The expanding layers 20 and the barrier layers 22 are arranged in an alternating sequence (expanding-barrier-expanding-barrier) on top of the bulk composite 12, thus forming a "surface laminate" protecting the underlying bulk composite 12 in an event of exposure to fire at the side on which the bulk composite 12 is covered by the surface laminate 14. In this respect, different from the shown example, in which the bulk composite 12 is covered only on one side, the bulk composite 12 may also be covered on both sides with a surface laminate of the kind described herein.

The fire-protecting effect of the surface laminate 14 substantially relies on a particular behavior of the expanding layers 20. Namely, when these expanding layers 20 are heated due to exposure to fire (cf. flames 24 symbolized in FIG. 2), the expanding layers 20 increase their thickness (expand, e.g. by some kind of foaming) and/or loose their binding to adjacent layers (delaminate). This behavior leads to a decrease of the thermal conductivity of the surface laminate 14, retarding the rise in temperature in the bulk composite 12.

Figure 2:
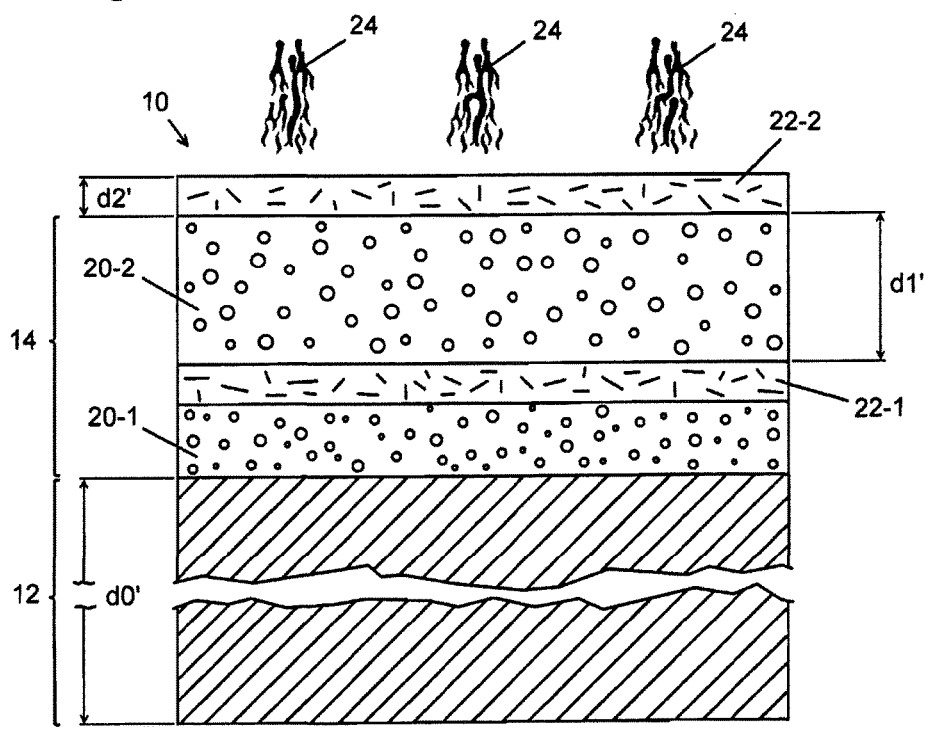
FIG. 2 shows the material of FIG. 1 during exposure to fire.

FIG. 2 illustrates the material 10 during the impact of fire, symbolized by the flames 24.

As can be seen from a comparison between FIG. 1 and FIG. 2, the fire causes the surface laminate 14 to heavily (or at least substantially) expand, so that the further progress of heat from the fire towards the bulk portion 12 is impeded.

In the original (intact) state of the material 10, the outer expanding layer 20-2 and the outer barrier layer 22-2 have thicknesses d1 and d2, respectively, shown in FIG. 1. The thickness of the bulk composite is designated by d0.

In the exposed (heated) state as shown in FIG. 2, the layers 20-2 and 22-2 have thicknesses d1' and d2' respectively (The thickness of the bulk composite 12 is designated by d0'). In this situation, the thickness d1' is heavily increased in comparison to the original thickness d1. In practice, depending on the design of the expanding layer 20-2, this increase in thickness may result in an thickness d1', which is more than 10, preferably more than 20 times the thickness of d1. FIGS. 1 and 2 are not drawn in scale. They shall only illustrate the qualitative modification of the surface laminate 14 during fire impact.

Preferably, the expanding layers 20 are designed to show the expanding and/or a delaminating effect already during the early stages of fire. Advantageously, these layers 20 begin to expand and/or delaminate remarkably already at temperatures of less than 400° C., preferably less than 250° C.

As there will be a temperature gradient in the material 10 during the heating, the heat-induced effects are stronger in the outer regions (near the surface of the material) than in the inner regions. This is also illustrated in FIG. 2, in which the inner expanding layer 20-1 is also expanded with respect to the original state shown in FIG. 1, but not as much as the outer expanding layer 20-2.

In the shown example, there is no remarkable change of the thickness of the barrier layers 22-1 and 22-2. The barrier layers 22 (second layers) are different from the expanding layers 20 (first layers) and serve to impede a transport of heat and/or gases through these layers. In the shown example, the barrier layers 22 in particular prevent oxygen from the outside air from diffusing to the combustible matrix of the bulk composite 12 and prevents gaseous combustible products from the bulk composite 12 from diffusing towards the outside ("ignition zone").

In the shown embodiment, the expanding layers 20 each are formed by a thermoplastic film, e.g. made of PEI or PES, and containing intumescent modifiers. In the example, these films contain foaming agents for promoting the increase of thickness induced by heat. In addition or as an alternative, the films may also contain fiber material, e.g. loose fibers embedded in the thermoplastic material or a fiber mat extending in the thermoplastic film.

Preferably, each of the expanding layers 20 (in this example: 20-1 and 20-2) has a thickness in the range of 5 to 100 μm, increasing at least by a factor of 10 when heated to its expansion temperature (e.g. approx. 300° C. or less).

In the shown example, the barrier layers 22 (22-1 and 22-2) each comprise a surface matrix (e.g. resin) with reinforcing fibers embedded therein. In the shown example, short fibers dispersed in a matrix of polyamideimide or polyimide are used. In another embodiment, the material of the surface matrix is identical to the material of the bulk matrix (e.g. an epoxy resin system). This can facilitate the manufacture of the composite material 10 insofar as an infusion process can be provided to simultaneously infuse the bulk portion 12 and the surface portion 14. In principle, instead of short fibers in the barrier layers 22, there can be also used continuous fibers extending in these layers.

Any kinds of fibers incorporated in the expanding layers 20 will advantageously increase the mechanical strength of the surface laminate 14. This distinguishes the described example from conventional, established forms of intumescent and barrier type fire protection.

Figure 3:
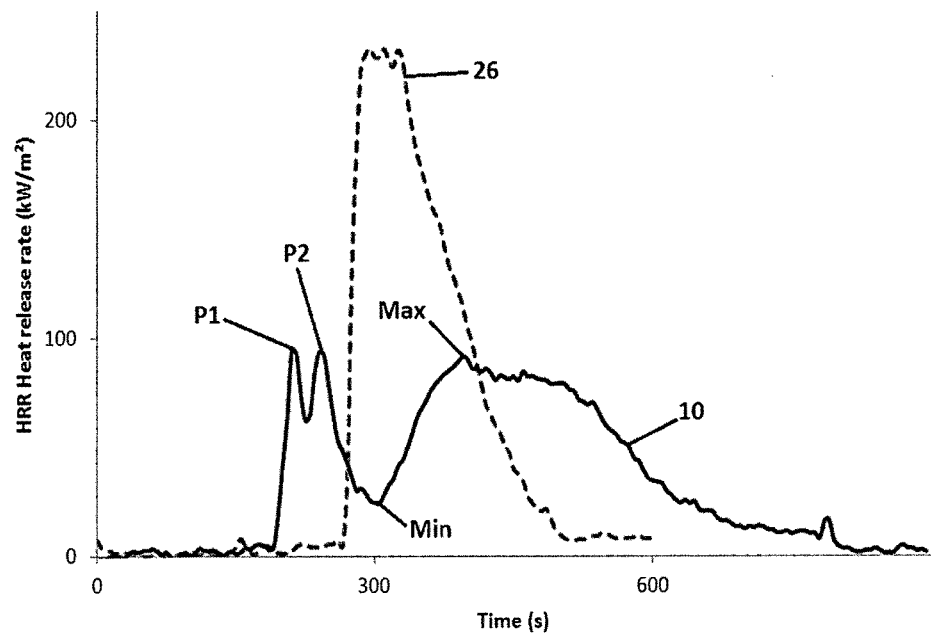
FIG. 3 shows the heat release rate vs. time for a multi-layer design of a fiber-reinforced composite material and of a reference before and during exposure to fire.

FIG. 3 shows the heat release rate vs. time for a multi-layer design of a fiber-reinforced composite material 10 and of a reference before and during exposure to fire.

In the shown example of FIG. 3 a specimen or sample of a composite 10 having a thickness of 4 mm has been used. In this example two expanding layers 20, 20-1, 20-2 are used. The thickness of the expanding layers 20, 20-1, 20-2 is 125 μm. The expanding layers 20 are made of a thermoplastic film. In this example Polyetherimid has been used.

Two barrier layers 22, 22-1, 22-2 are arranged in alternating sequence with the expanding layer. The thickness of the barrier layers 22, 22-1, 22-2 is 250 μm. The barrier layers 22, 22-2, 22-2 are of the same material as the bulk portion 12, so that the thickness of the barrier layer 22, 22-1, 22-2 can be increased without a loss in mechanical properties. The bulk portion 12 comprises carbon reinforced epoxy resin. It shall be noted that similar results can be achieved for barrier layers 22, 22-1, 22-2 of different material than the bulk portion 12.

The expanding layers 20, 20-1, 20-2 are perforated with a needle in a rectangle perforation pattern. The perforation distance is 1 cm and the aperture 25 diameter is 1 mm.

FIG. 3 shows the heat release rate of the before mentioned composite 10 and the heat release rate of a reference 26. The reference 26 is a conventional bulk material as known in the state of the art which does not have a multi-layer design. The reference 26 has a thickness of 4 mm.

Both, the composite 10 having the expansion layers 20, 20-1, 20-2 and barrier layers 22, 22-1, 22-2 as described above, as well as the reference 26 are loaded with a heat flux of 25 kW/m². Higher heat fluxes are possible; in that case the time to ignition could be lower and the peak heat release higher.

In FIG. 3 the heat release rate is shown on the vertical axis and the time on the horizontal axis. The reference 26 ignites between 200 and 300 seconds and goes out after the combustible material is consumed after 500 seconds.

For the composite 10 the outer expanding layer 20-2 which is the nearest to the heat source starts to expand and/or delaminate before ignition, i.e. before 60 seconds, as shown in FIG. 3. The time to ignition decreases compared to the reference 26. After ignition and 200 seconds after loading the composite 10 with the heat flux the combustible part of the outer barrier layer 22-2 has been consumed and/or carbonized. This can be seen as a first peak P1 for heat release, which is significantly lower than the heat release of the reference 26.

After the combustible part of the outer barrier layer 22-2 has been consumed and/or carbonized, the heat release decreases until the protection from the outer expanding layer 20-2 decreases and the inner barrier layer 22-1 between the expansion layers 20-1 and 20-2 starts to burn, so that the heat release increases again to a second peak P2 of approximately the same size as the first peak P1.

After both barrier layers, the outer barrier layer 22-2 and the inner barrier layer 22-1, are consumed and/or carbonized, the heat release decreases to a minimum Min. In some tests performed with the composite 10 as described above and under the same conditions, an extinction of the flame has been observed at the Minimum Min.

After collapse of the expanding layers 20-1, 20-2 the rest of the material (the bulk portion 12) starts to decompose and the heat release rises again to a maximum Max.

The maximum Max of the heat release of the composite 10 is lower than the peak heat release rate of the reference 26 and decreases until the combustible material of the bulk portion 12 is consumed at about 800 seconds.

Figure 4:
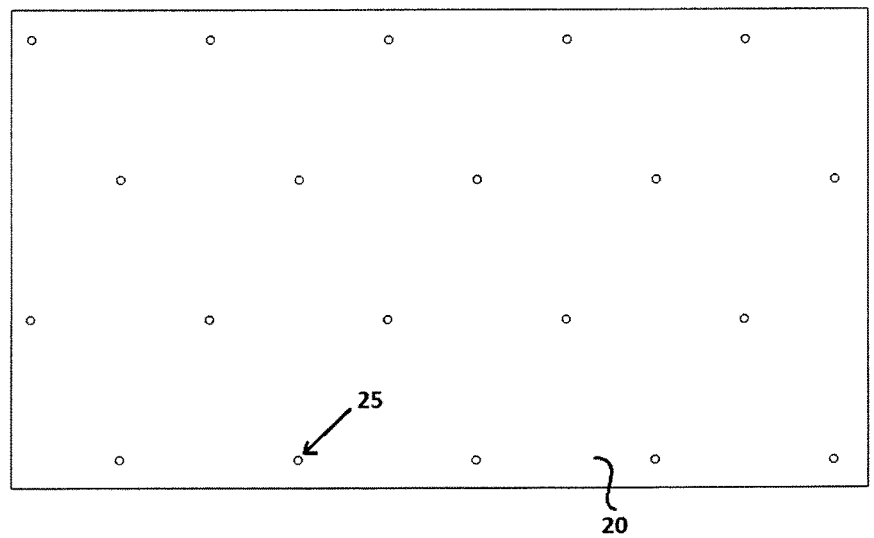
FIG. 4 shows a perforated thermoplastic film as used for an expanding layer.

In FIG. 4 a perforated thermoplastic foil as used for expanding layers 20 is shown.

A needle perforation has been used to create the apertures 25 in the film. A hexagonal perforation pattern is provided. The perforation distance is 20 mm. The apertures 25 are holes having a diameter of 1 mm.

A preferred use of the fiber-reinforced composite material 10 is the formation of shell-like structural components for aerial vehicles, in particular airplanes or helicopters. The expandable thermoplastic interleaves (expanding layers 20) cause a remarkably increased fire protection of the respective structural components.

Although in the described example the "bulk portion" and the "surface portion" are distinguishable from each other, the alternating expanding layers and barrier layers might take up 100% of the laminate (fiber-reinforced composite material). In this case, the bulk portion and the surface portion have the same layer structure or may be even identical. In such material, in particular, the barrier layers may be formed by layers which are conventional for forming fiber-reinforced composite material. In addition and alternatively, the above-described particular barrier layers may also be used (including also barrier layers made of metal etc.).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Fiber-reinforced composite material
12 Bulk portion
14 Surface portion
20 Expanding layers
20-1 Inner expanding layer
20-2 Outer expanding layer
22 Barrier layers
22-1 Inner barrier layer
22-2 Outer barrier layer
24 Flames
25 Aperture
26 Reference
P1 First peak
P2 Second peak
Min Minimum
Max Maximum

The invention claimed is:

1. A fiber-reinforced composite material, comprising:
a multilayer bulk portion forming a bulk of the fiber-reinforced composite material and comprising a plurality of fiber material layers embedded in a bulk matrix; and
a surface portion comprising a plurality of laminated first layers structurally configured to expand or delaminate during fire impact and a plurality of laminated second layers different from the plurality of laminated first layers, wherein the plurality of laminated first layers are arranged in an alternating sequence with the plurality of laminated second layers,
wherein at least one of the laminated first layers comprises a thermoplastic film, the thermoplastic being a polymer selected from a group consisting of Polyimide, Polyetherimide, Polyether sulfone, Polyamide, Polyamide-imide, Polysulfone, Polyphenylsulfone, Polyetherketone, Polyethylene terephthalate, Polyethylene, Polyester, Polyetherester, Polyesteramide, Polymethylmethacrylate, Polypropylene, Polystyrene, Polyvinylchloride or mixtures thereof.

2. The fiber-reinforced composite material of claim 1, wherein at least one of the plurality of laminated first layers comprises fibers.

3. The fiber-reinforced composite material of claim 1, wherein at least one of the plurality of laminated first layers comprises an intumescent modifier.

4. The fiber-reinforced composite material of claim 1, wherein at least one of the plurality of laminated first layers has a thickness in a range of 5 to 300 μm.

5. The fiber-reinforced composite material of claim 1, wherein at least one of the plurality of laminated first layers has a thickness in a range of 10 to 200 μm.

6. The fiber-reinforced composite material of claim 1, wherein at least one of the plurality of laminated first layers has a thickness in a range of 20 to 130 μm.

7. The fiber-reinforced composite material of claim 1, wherein at least one of the plurality of laminated first layers has a thickness of approximately 125 μm.

8. The fiber-reinforced composite material of claim 1, wherein at least one of the plurality of laminated second layers comprises a surface matrix with embedded reinforcing fibers.

9. The fiber-reinforced composite material of claim 1, wherein at least one of the plurality of laminated second layers comprises a polymer.

10. The fiber-reinforced composite material of claim 1, wherein at least one of the plurality of laminated second layers comprises a resin matrix with inorganic particles dispersed in the resin matrix.

11. The fiber-reinforced composite material of claim 1, wherein at least one of the plurality of laminated second layers comprises a resin matrix with organic particles dispersed in the resin matrix.

12. The fiber-reinforced composite material of claim 1, wherein the plurality of laminated first layers are configured to expand or delaminate during fire impact above 100%.

13. A structural component, comprising:
a fiber-reinforced composite material, comprising
a multilayer bulk portion forming a bulk of the fiber-reinforced composite material and comprising a plurality of fiber material layers embedded in a bulk matrix; and
a surface portion comprising a plurality of laminated first layers structurally configured to expand or delaminate during fire impact and a plurality of laminated second layers different from the plurality of laminated first layers, wherein the plurality of laminated first layers are arranged in an alternating sequence with the plurality of laminated second layers,
wherein at least one of the laminated first layers comprises a thermoplastic film, the thermoplastic being a polymer selected from a group consisting of Polyimide, Polyetherimide, Polyether sulfone, Polyamide, Polyamide-imide, Polysulfone, Polyphenylsulfone, Polyetherketone, Polyethylene terephthalate, Polyethylene, Polyester, Polyetherester, Polyesteramide, Polymethylmethacrylate, Polypropylene, Polystyrene, Polyvinylchloride or mixtures thereof, and
wherein structural component is a component of an aerial vehicle.

* * * * *